July 15, 1969   F. BESCRIPT ET AL   3,455,086
APPARATUS FOR ASSEMBLING SLEEVE AND INSERT PACKAGES
Filed Sept. 15, 1966   8 Sheets-Sheet 1

FIG. I.

INVENTORS
FREDERICK BESCRIPT
& ALTEN E. WHITECAR
BY

ATTORNEYS

INVENTORS
FREDERICK BESCRIPT &
ALTEN E. WHITECAR

ATTORNEYS

July 15, 1969 F. BESCRIPT ET AL 3,455,086
APPARATUS FOR ASSEMBLING SLEEVE AND INSERT PACKAGES
Filed Sept. 15, 1966 8 Sheets-Sheet 6

INVENTORS
FREDERICK BESCRIPT &
ALTEN E. WHITECAR
BY
ATTORNEYS

FIG. 9

INVENTORS
FREDERICK BESCRIPT &
ALTEN E. WHITECAR

ATTORNEYS

United States Patent Office 3,455,086
Patented July 15, 1969

3,455,086
APPARATUS FOR ASSEMBLING SLEEVE AND
INSERT PACKAGES
Frederick Bescript, Cherry Hill, and Alten E. Whitecar, Westville, N.J., assignors to Smith Kline & French Laboratories, Philadelphia, Pa., a corporation of Pennsylvania
Filed Sept. 15, 1966, Ser. No. 579,692
Int. Cl. B65b 47/06, 43/41
U.S. Cl. 53—169                                                12 Claims

ABSTRACT OF THE DISCLOSURE

Apparatus for automatically assembling a package comprising a sleeve and an insert in which the sleeve and the inserts are fed in aligned spaced relation and a pusher, which is also moving in step with the sleeve and inserts, is actuated to push the inserts into the sleeves.

---

This invention relates to apparatus for assembling sleeve and insert packages. The invention is of particular value for assembling sleeve and frame assemblies where the frame contains a packet of cellophane or the like.

It is well known in the packaging art to encapsulate articles between a pair of heat sealable films, support the thus encapsulated article in a foldable frame having openings to accommodate the article and insert the assembly into a sleeve. This form of packaging is widely used in the pharmaceutical field or capsules by way of example.

Such packaging has been, in part, automated as is seen from U.S. Patent 2,902,806, the disclosure of which is incorporated herein by reference. While the apparatus of Patent 2,902,806 was a substantial advance in the art, its rate of production is restricted due to its intermittent operation throughout.

In accordance with this invention, there is provided an apparatus which continuously assembles sleeves and inserts while they are being continuously conveyed. This apparatus provides for the assembly at a rapid rate. Further, it provides for smoother and quieter operation and a longer life for the operating parts.

The invention will be further clarified by the following description read in conjunction with the drawings in which.

Figure 1:
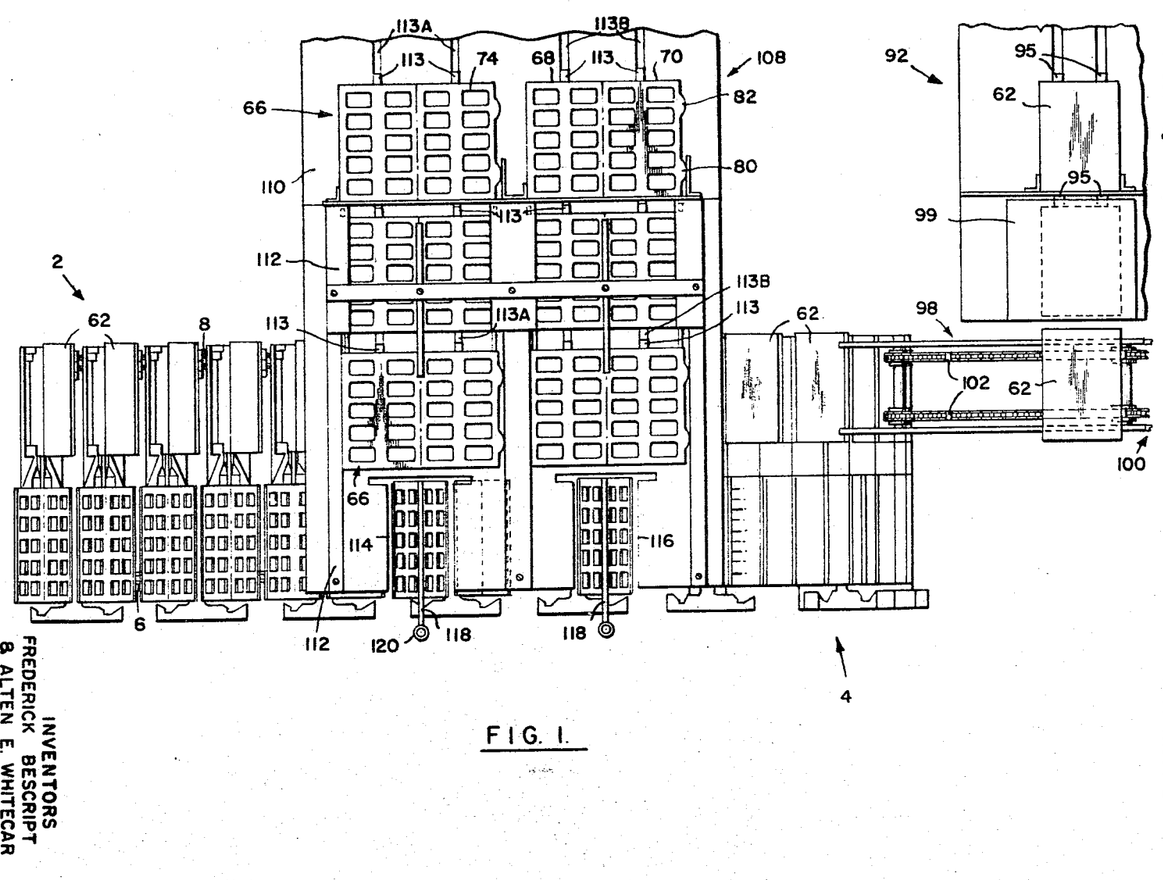
FIGURE 1 is a plan view, partially broken away, of the loading end of the apparatus.
Figure 5:
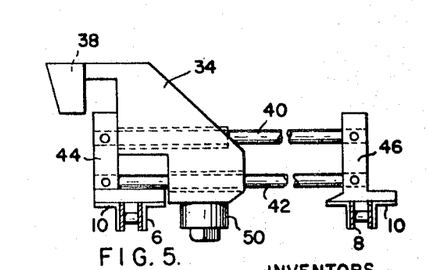
FIGURE 5 is a side elevation of the pusher of the apparatus of FIGURE 3, partially broken away.

Referring first to FIGURE 1 an assembling apparatus 2 in accordance with the invention has an endless conveyor 4 provided with a pair of endless bent lug conveyor chains 6 and 8 which are continuously driven by means not shown. Each chain is provided with securing lugs 10 as best seen in FIGURE 5.

Figure 3:
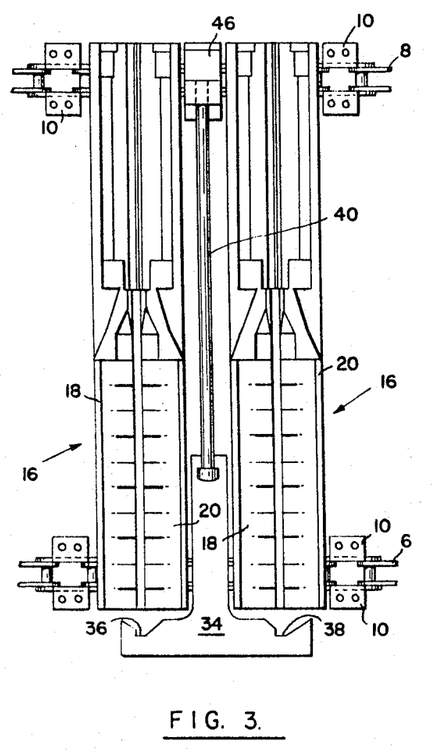
FIGURE 3 is a plan view, partially broken away, showing a frame and sleeve holder of the apparatus of FIGURE 1.
Figure 4:
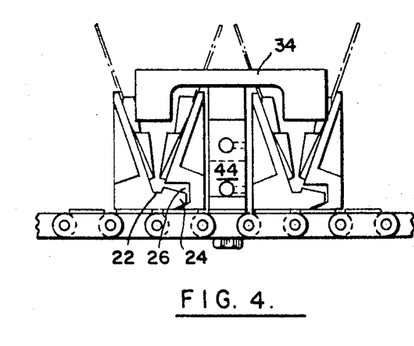
FIGURE 4 is a front elevation of the apparatus of FIGURE 3.

As best seen in FIGURE 3 conveyor 4 has a plurality of spaced frame and sleeve holders 16, each having a pair of opposed upwardly extending members 18 and 20. Members 18 and 20 are secured to lugs 10 of chains 6 and 8 by any conventional means such as machine screws (not shown). Each member 18 has a lower retaining groove 22 and a nose portion 24 which is accommodated by a recessed portion 26 of upstanding member 20 (see FIGURE 4).

Between each pair of support members 16 there is provided a pusher 34 provided with article engaging recesses 36 and 38 (FIGURE 3). Pusher 34 is mounted to slide on rods 40 and 42 which are fixedly secured respectively to blocks 44 and 46 mounted on opposed lugs 10 on chains 6 and 8, as best seen in FIGURE 5. Each pusher 34 is provided with a downwardly extending cam follower roller 50 mounted for rotation on a vertical axis (FIGURE 5).

Figure 6:
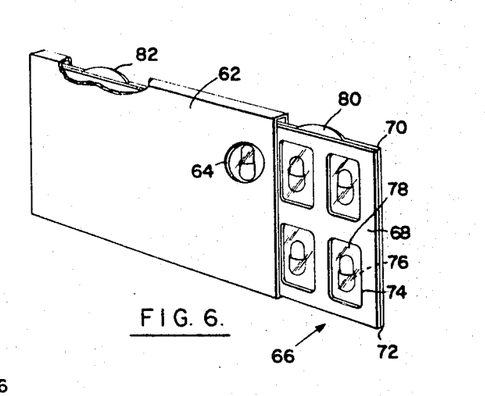
FIGURE 6 is a front perspective view of a partially assembled package in accordance with the invention.

Referring now to FIGURE 6, a sleeve 62 of, for example, cardboard, is provided with a window 64 and partially contains a frame 66 which also may be of cardboard. Frame 66 comprises panels 68 and 70 hinged together as indicated at 72. Each panel is provided with a plurality of openings 74 to accommodate capsules 76 which are encapsulated in a cellophane packet indicated at 78. Panel 70 as shown in FIGURE 6 has a height substantially less than the height of the interior of sleeve 62 which facilitates entering frame 66 into the sleeve 62 with the apparatus of the invention as will be detailed later. Panel 70 is provided with tabs 80 and 82 to cause frame 66 to fit snugly within sleeve 62 when the assembly is completed.

Figure 2:
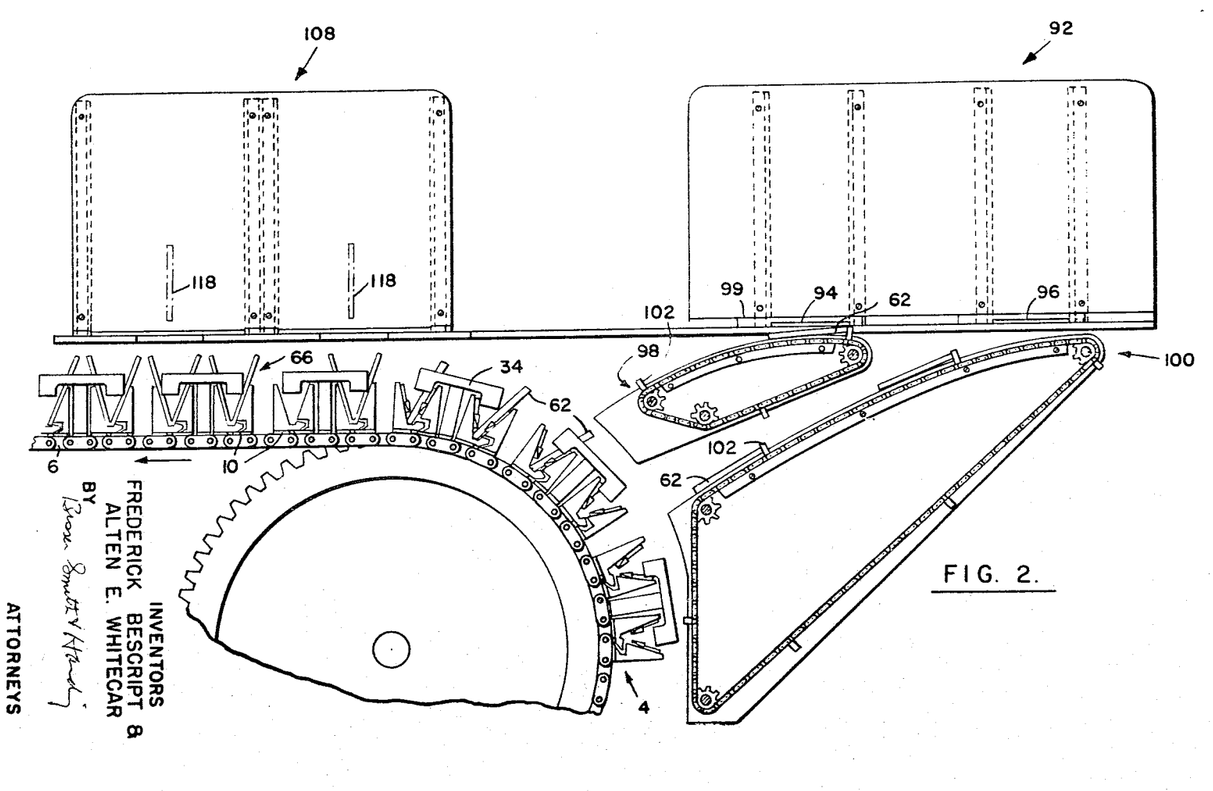
FIGURE 2 is a side elevation, partially broken away, of the apparatus of FIGURE 1.

While it will be appreciated that any or all of sleeves 62, frames 66 and packets 78 can be readily hand loaded onto conveyor 4, it is advantageous to provide for automated loading. It is well known to feed sleeves and frames from respective stacks thereof as is described in detail in Patent 2,902,806. Mechanism for feeding simultaneously a pair of sleeves 62 is indicated at 92 (FIGURE 2). The sleeves pass through openings 94 and 96, respectively, and are advanced by reciprocating fingers 95 (FIGURE 1) stepwise through a presser 99 of the type shown in FIGURE 28 of Patent 2,902,806 to open up the sleeve and thence onto conveyors indicated at 98 and 100, respectively. The conveyors are each provided with lugs 102 to move a sleeve 62 until it is discharged by gravity to the desired position between upstanding members 18 and 20, conveyors 98 and 100 loading alternate holders 16. In this manner sleeves 62 are loaded onto conveyor 4 into successive holders 16, each sleeve 62 being deposited in the rear end of the associated holder 16 as viewed in FIGURE 1.

Similarly pairs of frames 66 are fed simultaneously from the magazine indicated at 108 in FIGURE 1 onto a table 110. Frames 66 are repeatedly advanced from magazine 108 across the table 110 being guided by a frame indicated at 112 until positioned over openings 114 and 116, respectively, and below the associated vertical plate 118. The frames 66 are advanced by a series of reciprocating fingers 113 which extend upwardly through slots 113A and 113B. When desired as an alternative, the frames 66 can be positioned over openings 114 and 116 by hand. Each plate 118 is fixedly secured to a reciprocating rod 120 which is reciprocated in timed relation with the conveyor 4 by a spring-cam mechanism not shown in order to fold a frame 66 downwardly into the front portion of a holder 16. After each plate 118 moves upwardly the next frame 66 is advanced to the position to be folded.

Figure 2A:
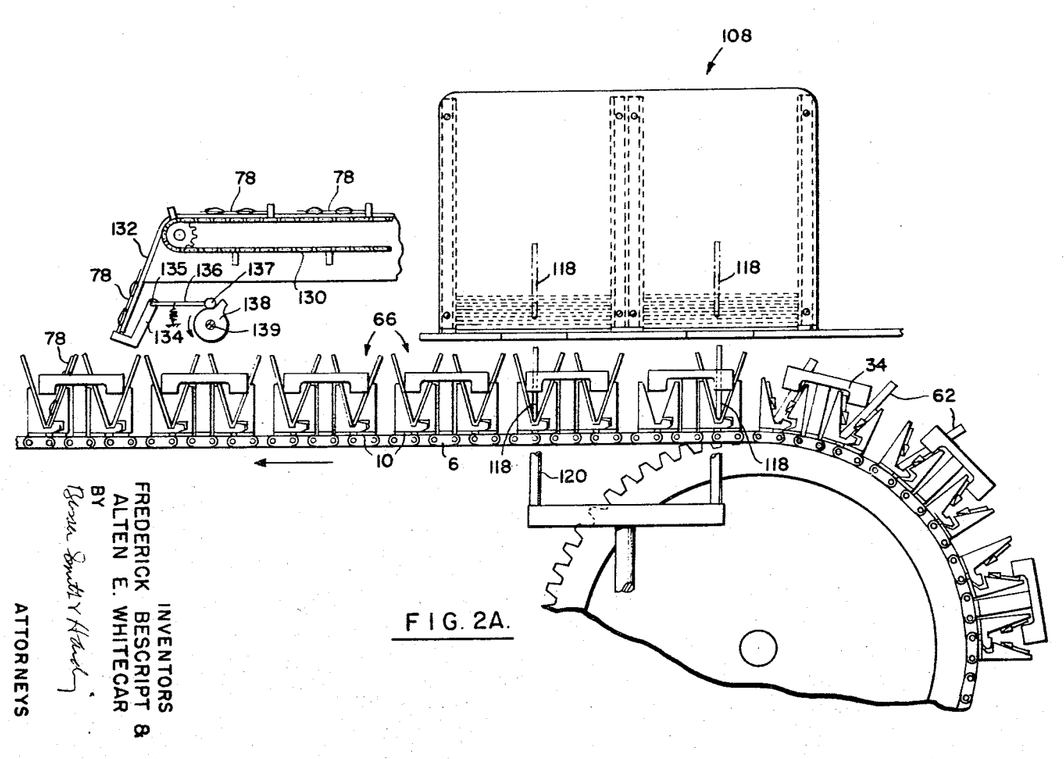
FIGURE 2A is a partially broken away diagrammatic side view of a portion of the loading mechanism.

As best seen in FIGURE 2A an endless conveyor 130 advances the capsule containing packet 78 in timed relation to conveyor 4 to a slide 132 where the packet is retained by gate 134 which is secured fixedly to a shaft 135. A rocking lever 136 is fixedly secured to shaft 135 and has a cam follower 137 actuated by a cam 138 secured to a shaft 139 moving in timed relation with the conveyor 4 to cause the gate 134 to open and release a packet 78 into each frame 66 in each holder 16.

As indicated above, the sleeves, frames and packets may when desired be hand loaded. In any event with the sleeves, frames and packets positioned on the conveyor as described above they are advanced by the conveyor for assembly.

Figures 8, 8A:
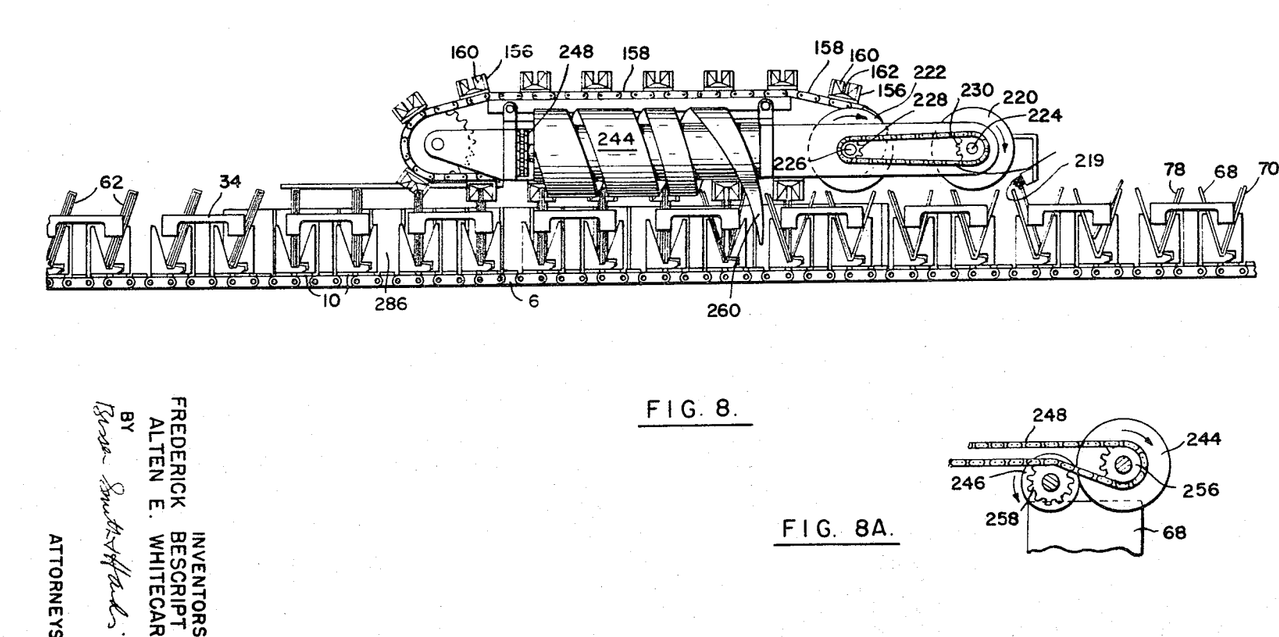
FIGURE 8 is a side elevation of elements of the apparatus shown in FIGURE 7.
FIGURE 8A is a section partially broken away taken on the plane indicated by the line 8A—8A in FIGURE 7.
Figure 9:
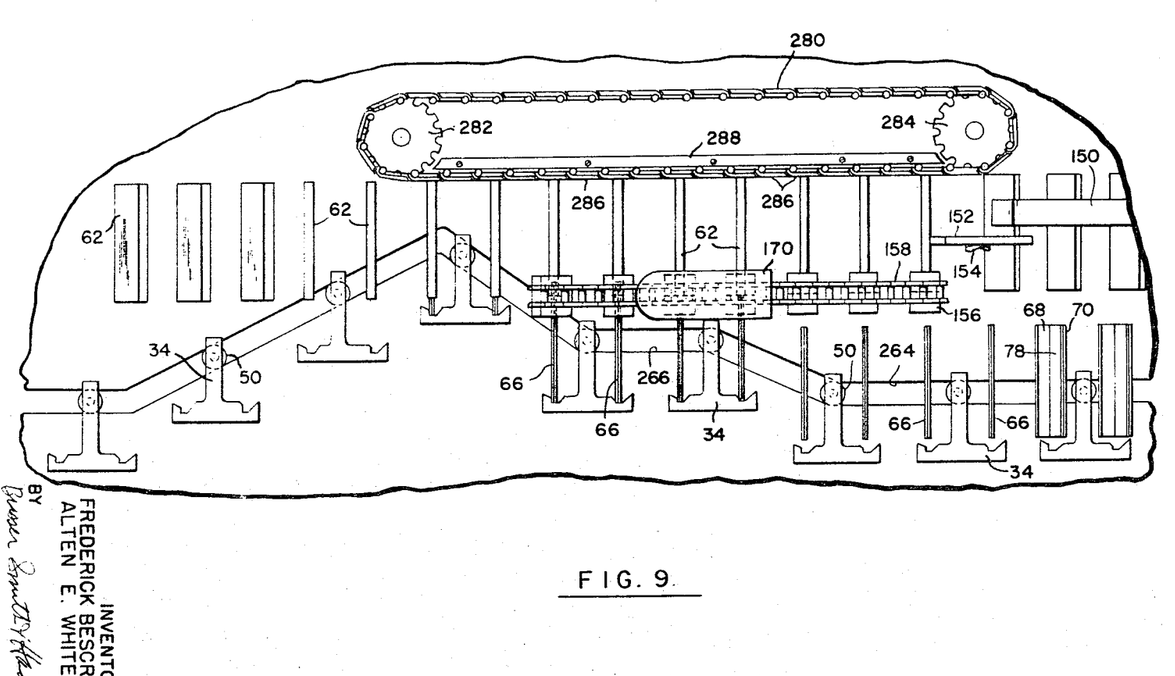
FIGURE 9 is a partially diagrammatic plan view of elements of the apparatus of FIGURE 7.
Figure 10:
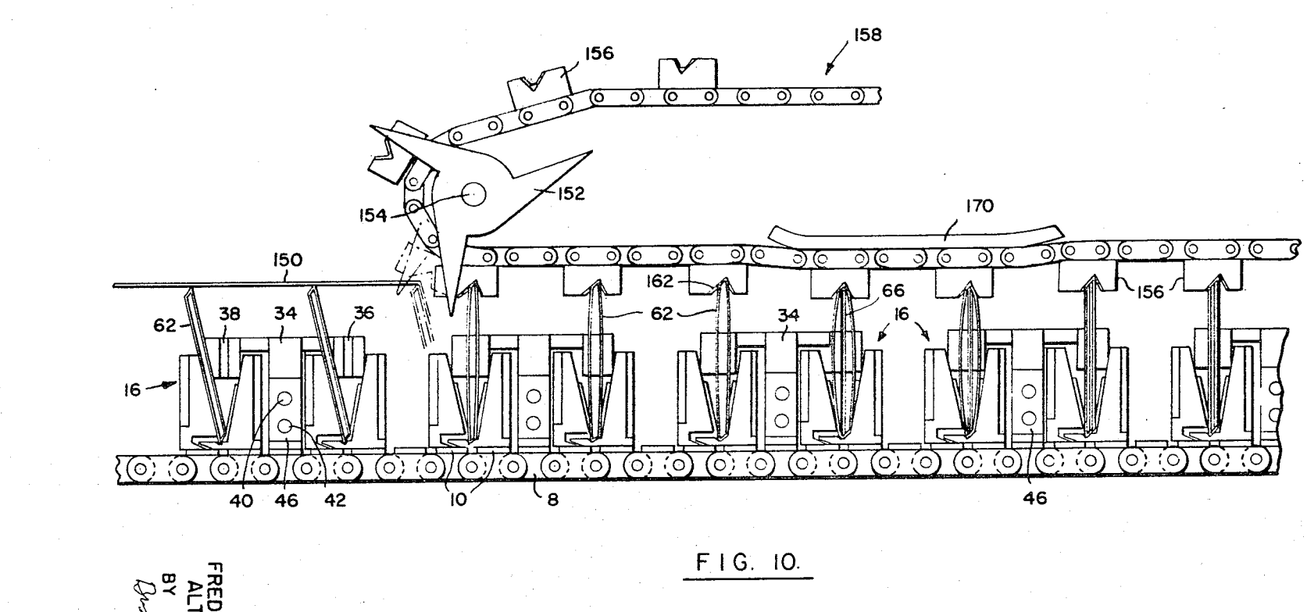
FIGURE 10 is a partially diagrammatic elevation from the rear of the apparatus of sleeve manipulating elements.

Attention is now turned to the portions of the apparatus shown in FIGURES 7–10. Referring first to operations performed on sleeve 62 they are conveyed to the left as viewed in FIGURE 7 to pass under a flexible strap 150 which by frictional engagement causes sleeves 62 to all be positioned lying against upstanding portion 20 of holder 16, that is to the right as viewed in FIGURE 7. As best seen in FIGURE 10, star wheel 152, which is driven by shaft 154 in timed relation with the conveyor 4, engages each thus positioned sleeve 62 and moves it into engagement with a guide member 156 mounted on endless conveyor 158. Each guide member 156 has a chamfered entrance 160 (FIGURE 8) leading to a slot 162 into which sleeve 62 fits (FIGURE 10). Guide members 156 hold the sleeve 62 accurately aligned to receive an insert. Conveyor 158 is driven by shaft 159 in timed relation with conveyor 4 and drives shaft 154.

Each guide member 156 is conveyed below a cam plate 170 (FIGURES 9–10) which moves the guide members downwardly a small amount to cause the sides of the sleeve 62 to bow out and form a widened entrance for the reception of an insert (FIGURE 10).

Figure 7:
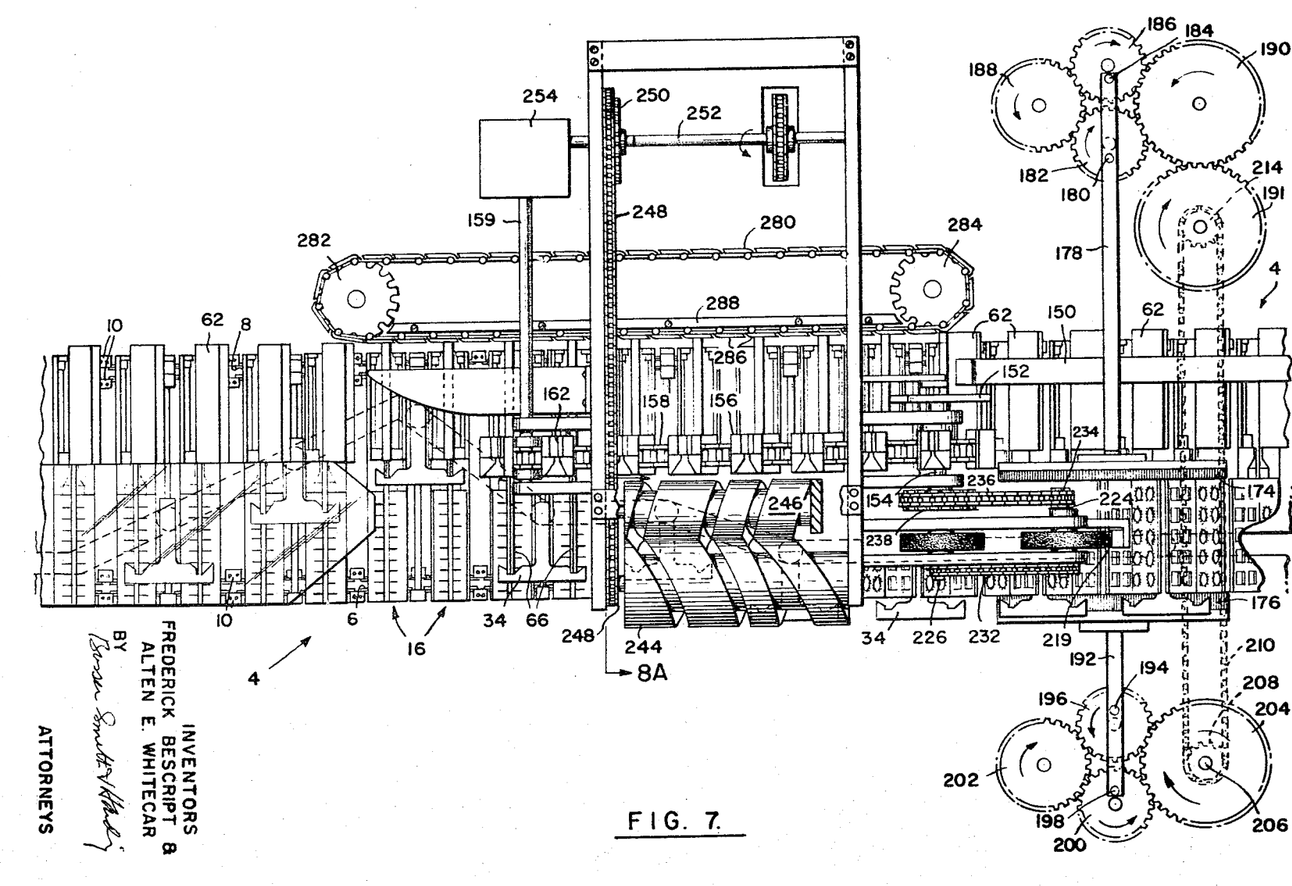
FIGURE 7 is a plan view, partially broken away, of the assembly portion of the apparatus.

In the meantime the frames 66 containing the packets 78 are also being conveyed from right to left as viewed in FIGURE 7 in step with the sleeves with which they are to cooperate. A pair of opposed brushes 174 and 176 are employed to align the packets 78 with their respective frames 66. Brush 174 is fixedly secured to a rod 178 which is pivotally connected at 180 to a gear 182 and at 184 to a gear 186, the said gears being in mesh with idler gear 188 and drive gear 190. Brush 176 is fixedly secured to a rod 192 which is pivotally connected at 194 to a gear 196 and at 198 to a gear 200, said gears 196 and 200 being in mesh with an idler gear 202 and a drive gear 204. Gear 204 is driven by a shaft 206 in timed relation with conveyor 4. Gear 204 also drives sprocket 208 which is connected to a chain 210 which drives sprocket 214 connected to gear 191 which drives gear 190.

To insure that each packet 78 is properly seated in a frame 66, a brush 219 flips to the right any improperly seated packet 78 which has its base against the right side of a frame 66 such as the one shown engaged by the brush 219 in FIGURE 8. A pair of brushes 220 and 222 rotating clockwise on horizontal shafts 224 and 226, respectively, as viewed in FIGURE 8 with their outer peripheries having a linear speed substantially greater than the linear speed of conveyor 4 with the linear speed of brush 222 being greater than that of brush 220 engage the tops of any improperly seated packets 78 flipping them from their position adjacent the right hand panel of the frame to the left as viewed in FIGURE 8 causing the base of the packets 78 to seat in the bottom of the V between the frame panels. The brush shafts 224 and 226 are respectively connected to sprockets 230 and 228 which are engaged by a chain 232. As best seen in FIGURE 7 shaft 224 is connected to a sprocket 234 driven by a chain 236 which in turn is driven by a sprocket 238 on shaft 154.

As best seen in FIGURE 8, the sides 68 and 70 of frame 66 are now folded tightly together and aligned for transfer into a sleeve 62 by means of opposite hand screw worms 244 and 246. As best seen in FIGURE 8A, worm 244 is driven by a sprocket-chain arrangement in a clockwise direction and worm 246 is driven in the opposite direction. While worm 246 is smaller than worm 244 in diameter, a horizontal plane tangent to the bottom of worm 244 is tangent to the bottom of worm 246. As seen in FIGURE 7, the chain 248 is driven by a sprocket 250 secured to shaft 252 which also drives a gear box indicated at 254 which is connected to the shaft 159. Chain 248 passes around sprocket 256 which drives worm 244 clockwise as viewed in FIGURE 8A and passes over sprocket 258 which drives worm 246 counterclockwise as viewed in FIGURE 8A.

As seen in FIGURES 7 and 8, worm 244 at its right hand end has a widening groove and a dependent portion 260 adapted to come in behind the trailing end of the frame 66. As the worms turn in timed relation with conveyor 4, sides 68 and 70 of frame 66 are held together (see FIGURE 8). The worms 244 and 246 are so dimensioned as to accommodate a pair of adjacent frames 66 thus oriented with their respective sides held together.

At this junction the pusher 34 associated with the two frames 66 positioned as discussed immediately above advances due to the interaction of its cam follower 50 with cam track 264 (see FIGURE 9) and urges the frames 66 toward the sleeves 62 carried by the conveyor support members 16 in which the frames are being carried. As best seen in FIGURE 9, pusher 34 urges the frames into their respective sleeves while the guide members 156 are below the cam plate 170 which facilitates the entrance of the frames due to the bowing out of the side of the sleeves (FIGURE 10). An endless chain 280 engaging sprockets 282 and 284 having vertical axes is moved at the linear speed of conveyor 4. Back up plates 286 are secured to chain 280. The chain 280 and plates 286 pass over a fixed vertical plate 288 to fix the position of plates 286 to back up sleeves 62 while frames 66 are being inserted, the plates moving along in timed relation with the sleeves. After the frames have been entered into the sleeves an amount short of engagement of tabs 82 with the respective sleeves, the cam follower 50 reaches a dwell portion 266 of cam track 264 wherein it remains until both guide members 156 involved have cleared cam plate 170. Cam track 264 then causes pusher 34 to advance until the frames 66 are fully inserted in their respective relaxed sleeves 62 which will now accept tabs 82, whereupon the cam track 264 causes pusher 34 to be fully retracted to its original position. This completes the assembly operation. The guide members 156 are moved upwardly by conveyor 158 clear of the sleeves. The sleeve-frame assembly is discharged when the endless conveyor 4 turns downwardly (not shown) or can be readily removed by hand.

What is claimed is:

1. Apparatus for assembling sleeves and tabbed inserts for the sleeves comprising:
    means for continuously conveying a succession of aligned sleeves and inserts,
    pusher means,
    means for conveying the pusher means in step with the sleeves and inserts,
    means to bow out the sleeves and then permit the sleeves to relax,
    means to advance the pusher means to advance the inserts into the aligned sleeves short of the tabbed portion while the sleeves are bowed out, to advance the inserts fully into the sleeves after the sleeves are permitted to relax and to retract the pusher means, and
    means to back up the sleeves as the inserts are being advanced into the sleeves.

2. The apparatus of claim 1 having means moving in step with the sleeve to accurately position the sleeve and guide the insert into the sleeve as it is pushed by the pusher means.

3. The apparatus of claim 1 having screw means to align the insert with the sleeve.

4. The apparatus of claim 3 having means to bring together a plurality of insert sheets.

5. Apparatus in accordance with claim 1 in which the insert comprises a folded frame and the apparatus has means for conveying the frame disposed in an upwardly open V, means for placing an article within the frame, and means for folding the frame closed on the article.

6. Apparatus in accordance with claim 5 having opposed means to align the article within the frame.

7. Apparatus for automatically assembling sleeves and inserts for the sleeves comprising:
- means for continuously conveying a succession of sleeves,
- means for continuously conveying a succession of inserts spaced from and in step with the sleeves,
- pusher means,
- means for conveying the pusher means in step with the inserts and sleeves,
- means to advance the pusher means to push the inserts into the sleeves and to retract the pusher means,
- means moving in step with the sleeves to bow out the sleeves prior to the advancing of the pusher means, and
- means to back up the sleeves as the inserts are being inserted.

8. The apparatus of claim 7 having means moving in step with the sleeve to accurately position the sleeve and guide the insert into the sleeve as it is pushed by the pusher means.

9. Apparatus for assembling sleeves and inserts for the sleeves comprising:
- means for continuously conveying a succession of sleeves,
- means for continuously conveying a succession of inserts spaced from and in step with the sleeves,
- pusher means,
- means for conveying the pusher means in step with the inserts and sleeves,
- means to advance the pusher means to push the inserts into the sleeves and to retract the pusher means,
- screw means to align the insert with the sleeve, and
- means to back up the sleeves as the inserts are being inserted.

10. The apparatus of claim 9 having means to bring together a plurality of insert sheets.

11. Apparatus for assembling sleeves and inserts of a folded frame type for the sleeves comprising:
- means for continuously conveying a succession of sleeves,
- means for conveying the frame disposed in an upwardly open V,
- means for placing an article within the frame,
- means for folding the frame closed on the article,
- means for continuously conveying a succession of closed inserts spaced from and in step with the sleeves,
- pusher means,
- means for conveying the pusher means in step with the inserts and sleeves,
- means to advance the pusher means to push the inserts into the sleeves and to retract the pusher means, and
- means to back up the sleeves as the inserts are being inserted.

12. Apparatus in accordance with claim 11 having opposed means to align the article within the frame.

References Cited

UNITED STATES PATENTS

| | | | |
|---|---|---|---|
| 1,647,745 | 11/1927 | Parker | 53—169 |
| 2,999,344 | 9/1961 | Clanin et al. | 53—186 |

TRAVIS S. McGEHEE, Primary Examiner

U.S. Cl. X.R.

53—252